United States Patent
Kainec et al.

(10) Patent No.: US 7,687,741 B2
(45) Date of Patent: Mar. 30, 2010

(54) TRIGGERING EVENTS IN A WELDER WITH A REAL-TIME CLOCK

(75) Inventors: Stephen M. Kainec, South Euclid, OH (US); Edward D. Hillen, Painesville, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 785 days.

(21) Appl. No.: 11/050,108

(22) Filed: Feb. 3, 2005

(65) Prior Publication Data
US 2006/0169682 A1      Aug. 3, 2006

(51) Int. Cl.
B23K 9/10      (2006.01)
B23K 9/00      (2006.01)

(52) U.S. Cl. .................................. 219/130.5; 219/136

(58) Field of Classification Search ............ 219/130.01, 219/130.5, 136
See application file for complete search history.

(56) References Cited

U.S. PATENT DOCUMENTS

| | | | |
|---|---|---|---|
| 2,170,861 A | | 8/1939 | Hobart |
| 4,060,709 A | * | 11/1977 | Hanson ................. 219/130.01 |
| 5,325,522 A | | 6/1994 | Vaughn |
| 5,708,253 A | | 1/1998 | Bloch et al. |
| 5,808,885 A | | 9/1998 | Dew et al. |
| 6,486,439 B1 | * | 11/2002 | Spear et al. ................. 219/136 |
| 6,624,388 B1 | | 9/2003 | Blankenship et al. |
| 2002/0168937 A1 | * | 11/2002 | Clark et al. ................... 455/41 |

FOREIGN PATENT DOCUMENTS

| | | |
|---|---|---|
| CA | 2386662 | 11/2002 |
| CA | 2387882 | 2/2003 |
| CN | 1256655 A1 | 6/2000 |
| CN | 2668381 Y | 1/2005 |
| WO | 2004114192 | 12/2004 |
| WO | 2005076953 | 8/2005 |

OTHER PUBLICATIONS

European Search Report dated Jun. 8, 2006 for European Patent Application Serial No. EP 06 00 1952, 3 pages.
Chinese Office Action mailed Dec. 5, 2008 for CN Application No. 200610079341.8, 12 pages.
Chinese Office Action mailed Jul. 3, 2009 for CN Application No. 200610079341.8, 29 pages.
European Office Action dated Feb. 29, 2008 for European Patent Application No. EP 06 001 952.8-2302, 10 pages.
Mexican Office Action mailed May 27, 2009 for Mexican Patent Application No. PA/a/2006/001387, 2 pages.
Canadian Office Action dated Sep. 25, 2009 for Canadian Patent Application Serial No. 2534955, 3 pages.

* cited by examiner

*Primary Examiner*—Sang Y Paik
(74) *Attorney, Agent, or Firm*—Turocy & Watson, LLP

(57) ABSTRACT

Systems and methods are disclosed that facilitate inducing one or more actions, such as generation of a shift report data related to construction device(s), via detection of specified triggering events. The system comprises a triggering component that determines whether a triggering event has occurred a control component that initiates an action in response to the triggering event. Triggering events can comprise specific times of day as determined by a real-time clock that can be associated with a construction/fabrication device, such as a welder. Additionally, actions responsive to triggering events can be tagged for human approval prior to initiation in order to provide system flexibility.

20 Claims, 10 Drawing Sheets

TRIGGERING EVENTS IN A WELDER WITH A REAL-TIME CLOCK

TECHNICAL FIELD

The subject invention relates generally to control of construction tools in a manufacturing environment, and more particularly to triggering action(s) in disparately located devices within the manufacturing environment.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of a construction process, wherein sophisticated controllers enable individual welders to operate within relevant portions of the process.

For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger construction environments and many times are spread across multiple locations. Given the nature and requirements of modern and more complex operations however, welding systems designers, architects and suppliers face increasing challenges in regard to upgrading, maintaining, controlling, servicing and supplying various welding locations. Unfortunately, many conventional welding systems operate in individually controlled and somewhat isolated locations in regards to the overall construction process. Thus, controlling, maintaining, servicing and supplying multiple and isolated locations in large centers, and/or across the globe, has become more challenging, time consuming and expensive.

For instance, manipulating and/or controlling a large number of individual tools, workstations, etc., across an expansive worksite can be a challenging endeavor. Moreover, a tool or workstation that is improperly maintained, irregularly serviced, etc., can have detrimental effects on production time tables, costs, product quality, and the like. Accordingly, there exists a need in the art for systems and/or methodologies that facilitate automated control of disparately located work tools in a manufacturing environment.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to novel systems and/or methodologies for inducing an action at one or more remotely located welding devices based on triggering events. According to an aspect of the invention, triggering events can be employed to cause a control component to initiate an action at the welder and/or to ensure that a welder is operating in a proper mode and/or not operating. For example, triggering events can comprise temporal occurrences, such as a specific time (e.g., 05:00, 19:00, . . . ) and/or ranges of time (e.g., 14:00-15:00 . . . ). According to this example, an event such as 21:00, or 9 pm (e.g., based on a clock or timer, which can be associated with a welder) can trigger a local control component to initiate an action, such as a power-down protocol in the welder to ensure that the welder is not operational after 9 pm. In this manner, in the event that an operator failed to properly shut down/power off a remote welder, the welder can be automatically powered down after 9 pm, thus saving power costs. Additionally, welders are often located disparately throughout a manufacturing environment and can be position in dangerous places (e.g., an unfinished high rise building, bridge . . . ). By providing an automatic shut down signal based on a triggering event (e.g., 21:00), the system mitigates a need for an operator to be required to return to a welder to shut it down and saves time associated such a task as well.

According to another aspect of the invention, a triggering event can be, for example, a temporal point that occurs after a predetermined lag period. For instance, the triggering event can be "1 hour after last action" (e.g., a determination can be made that the welder has not been utilized for an hour, thus providing an event that can trigger the welder to enter a power-save mode, . . . ), "end-of-shift," (e.g., in a manufacturing environment having one or more daily work shifts, . . . ), and the like. To further this example, a manufacturing plant can have three 8-hour shifts in a 24-hour day, each ending at 08:00, 16:00, and 00:00 (e.g., midnight), respectively. In this scenario, three triggering events can be pre-defined as 00:00, 08:00, and 16:00, which can be tracked and/or registered by, for instance, a shift timer associated with the welder. Upon detection of a triggering event, a control component can initiate a predefined action associated with the triggering event. For example, the control component can generate a shift report that can include information related to welder operation time during the shift (e.g., total operational time and/or down time), data related to resource consumption (e.g., wire, gas, other consumables, . . . ) by the welder during the shift, fault analysis data such as required maintenance and the like, duty cycle information, etc. It is to be appreciated that the preceding examples are illustrative of the type of information that can be generated and/or provided in a shift report upon detection of a triggering event and are not intended to be construed in a limiting sense.

According to yet another aspect of the invention, a triggering event can prompt a control component local to a remote welder to generate and transmit an email to a centralized control station. The email can notify a central operator of an operating condition, an alarm condition, a shift change, and the like, and/or can contain information related to a shift report (e.g., operation statistics, consumables usage, tip wear, . . . ) as detailed in accordance with other aspects of the subject invention. For instance, upon the end of a shift, en email can be generated to notify an overseer of information related to welder operation, resource availability and/or consumption, required maintenance, etc., or any other desired shift information. Moreover, the triggering event for the email notification is not limited to a shift change, but can be other temporal triggers, such as once an hour, upon the expiration of a predefined time period since a last weld and/or other action, etc.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
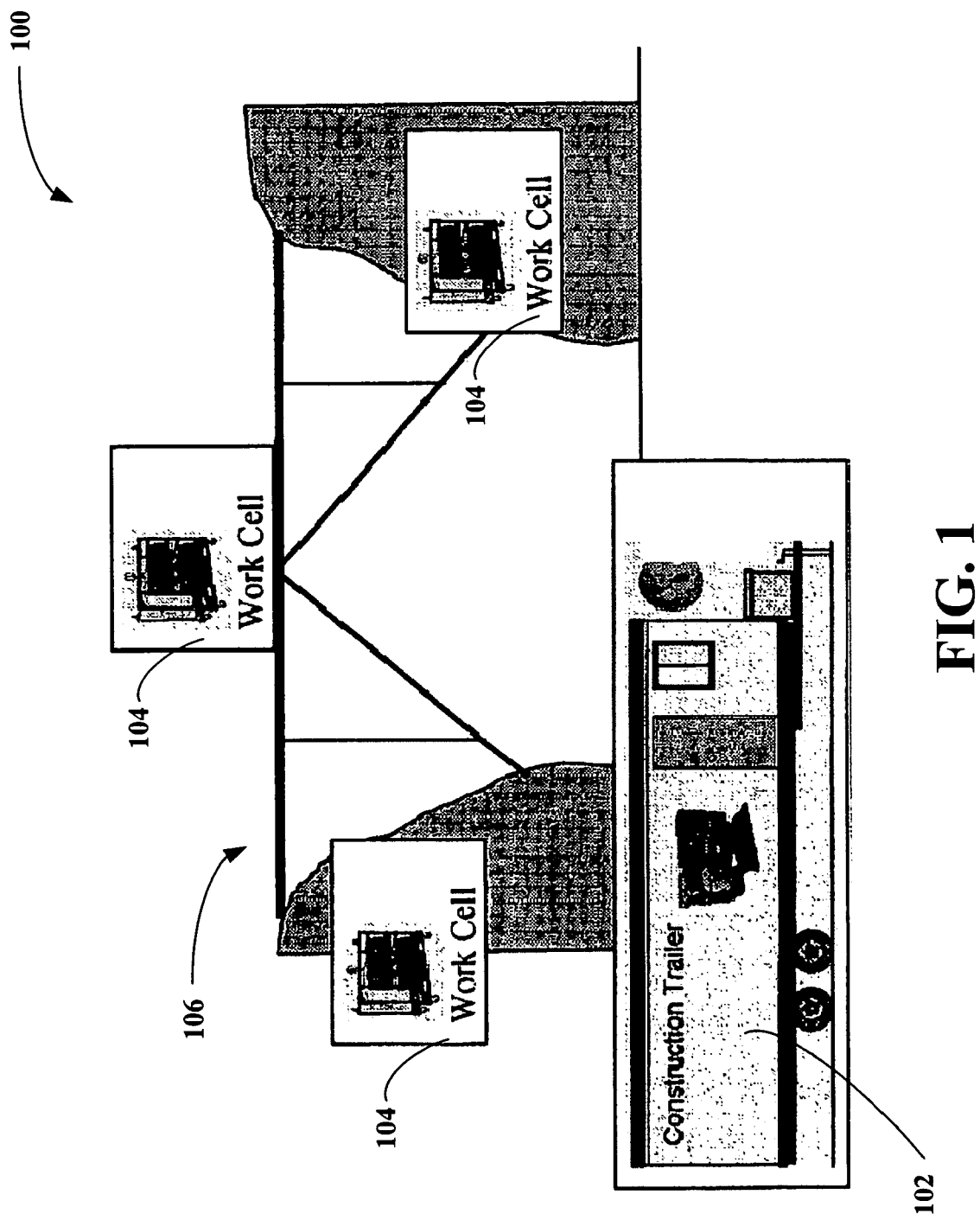
FIG. 1 is an illustration of a high-level system overview 100 in which a control site is in communication with one or more disparately located welders 104 on a job site 106 in an industrial environment.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, a computer readable memory encoded with software instructions, and/or a computer configured to carry out specified tasks. By way of illustration, both an application program stored in computer readable memory and a server on which the application runs can be components. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

A "welder" or "welding unit" refers to physical hardware for producing a weld such as a wire feeder, contact tip, dresser, gas mixer, gas sneezer, gas controller, clamp actuator, travel carriage/part manipulator, robot arm/beam/torch manipulator, laser seam tracker, other input/output devices and welding power source along with any controller(s), monitor(s), and communications interface(s) associated with the physical hardware. For example, a welder can be used to perform gas metal arc welding (GMAW), flux cored arc welding, metal cored arc welding, submerged arc welding (SAW), narrow groove welding, gas tungsten arc welding (GTAW), plasma arc welding, electron beam and laser welding, hard surfacing welding, arc gouging and manual shielded arc welding (SMAW).

"Welding procedure" refers to an act or acts involved in a joining process and can include consumables to be used in the process along with settings for various aspects of a welding system before, during, and/or after the joining process. For example, some of these aspects relate to control of power and waveforms supplied to an electrode, movements or travel of a welding tip during welding, electrode travel to other welding points, gas control to protect a molten weld pool from oxidation at elevated temperatures and provide ionized plasma for an arc, and other aspects such as arc stability to control quality of the weld.

FIG. 1 is an illustration of a high-level system overview 100 in which a control site 102 is in communication with one or more disparately located welders 104 on a job site 106 in an industrial environment. The control site 102 can be a mobile control site as depicted in the figure, a control room in a factory environment, and the like. The job site 106 can be, for example, a construction site, a manufacturing plant or factory, and/or any other suitable environment that employs construction/fabrication tools such as a welder. The subject invention provides for determining and/or predefining one or more triggering events that can cause a welder to perform an action in response thereto. For example, upon detection of the occurrence of a triggering event, a remote welder 104 can generate a shift report and transmit the report, for instance, via an email to the centralized control site 102 for human review of aspects of welder operation during a shift. The one or more welders 104 can be located at a construction site, as depicted in the figure, or can be disparately located in, for example, a factory or manufacturing plant, etc. For example, a welder 104 located on a bridge at the worksite 106 can be operational for a predetermined period every workday. However, due to various factors, it can be desirable to trigger an automatic power up and/or power down the welder in order to minimize operator time on, for instance, an unfinished and potentially dangerous bridge and/or operator time wasted in waiting for a welder to power up or down. For instance, a triggering event can be a predefined time, such as 06:00, as determined from a clock associated with the welder 104. At 06:00, a welder 104 can be triggered to power up so that it is ready for use by the time an operator reaches the welder 104. In this manner, the operator's physical presence at a work site is minimized to that amount of time required to perform a task associated with the construction or fabrication job (e.g., an operator need not spend time in the waiting for a welder to power up, for gas lines to prime, for system checks to be performed . . . ). In the event that the welder 104 is located in a large factory, triggering the welder to power up prior to a shift can reduce operating costs by ensuring that the welder is ready to be operated by the time an operator reaches it.

According to another example, an operator who forgets to power down a welder 104 in a remote area need not be required to return to the welder 104 to shut it down. The subject invention can improve overall work performance by defining a triggering event as, for instance, a time after a work period has ended, at which time the workstation can be directed to enter a low-power mode, purge gas lines, etc. In this case, an operator who forgets to power down his workstation can be relieved of an obligation to return to a distant or treacherously located workstation to properly shut it down. A timer local to the welder 104 can be employed to ensure that the welder 104 powers down at a predetermined time and/or powers up again at an appropriate time prior to a subsequent work period. The triggering event, in this case, can be, for example, 1 hour after a work period has ended, expiration of a predefined period of welder 104 inactivity, and the like.

Figure 2:
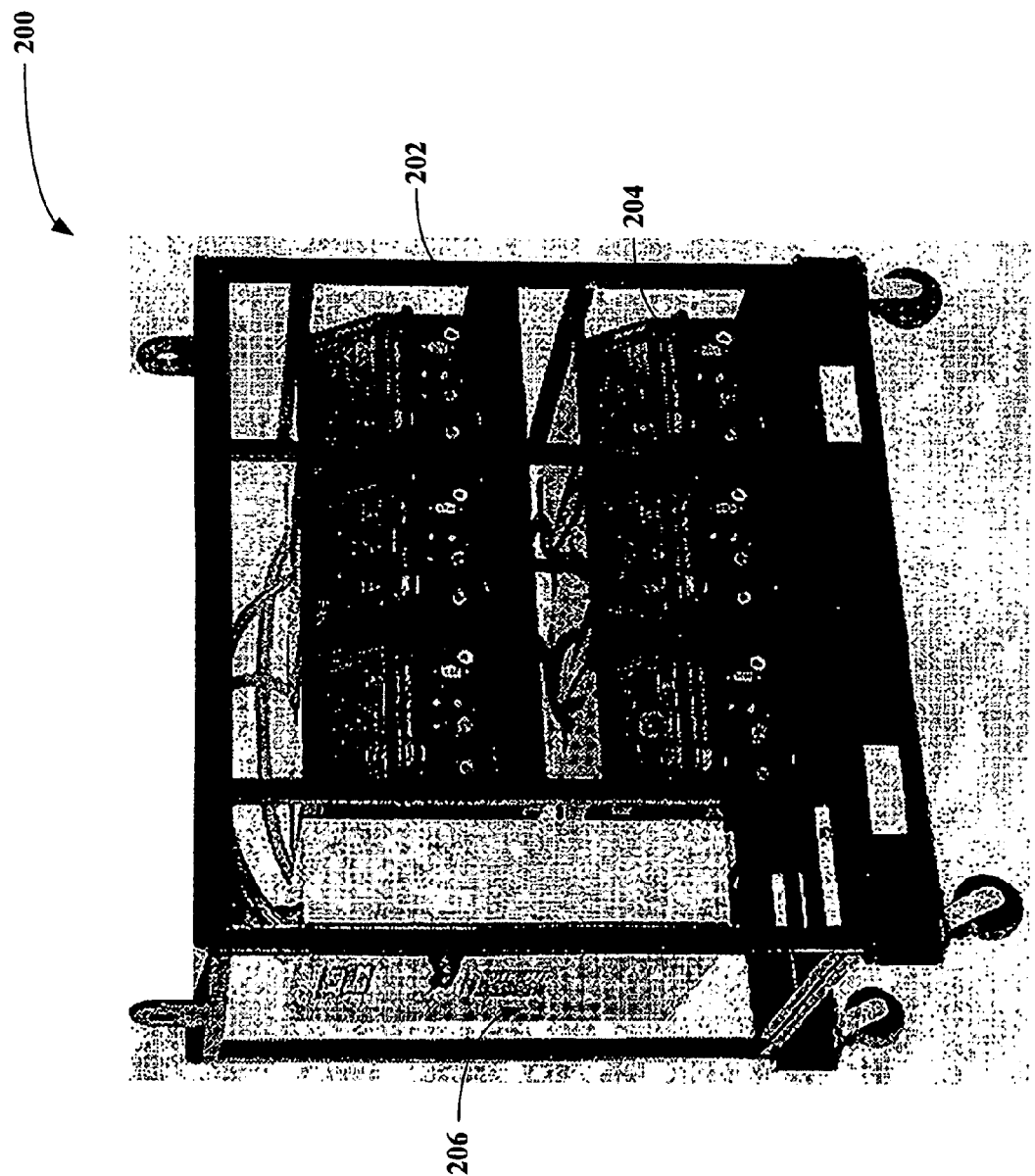
FIG. 2 is an illustration of a construction device management system 200 in accordance with an aspect of the present invention.

FIG. 2 is an illustration of a construction device management system 200 in accordance with an aspect of the subject invention. In this example, the construction device management system 200 is comprised of a rack system 202, construction devices 204, and a control box 206 that includes a power source and a communication component. However, it is to be appreciated that the subject systems and methodologies are not limited to such a configuration, and can comprise stationary welders, portable welders, or any other suitable construction device in a manufacturing environment, such as a factory, etc. The construction devices 204 shown are six welding units, three on each level of the rack system 202. The compactness and portability of the unit are especially well suited to employment in remote locations and/or throughout a factory environment. Typically, the units are self-contained and do not require additional equipment to be fully functional, although additional components can be employed in conjunction there with.

Figure 3:
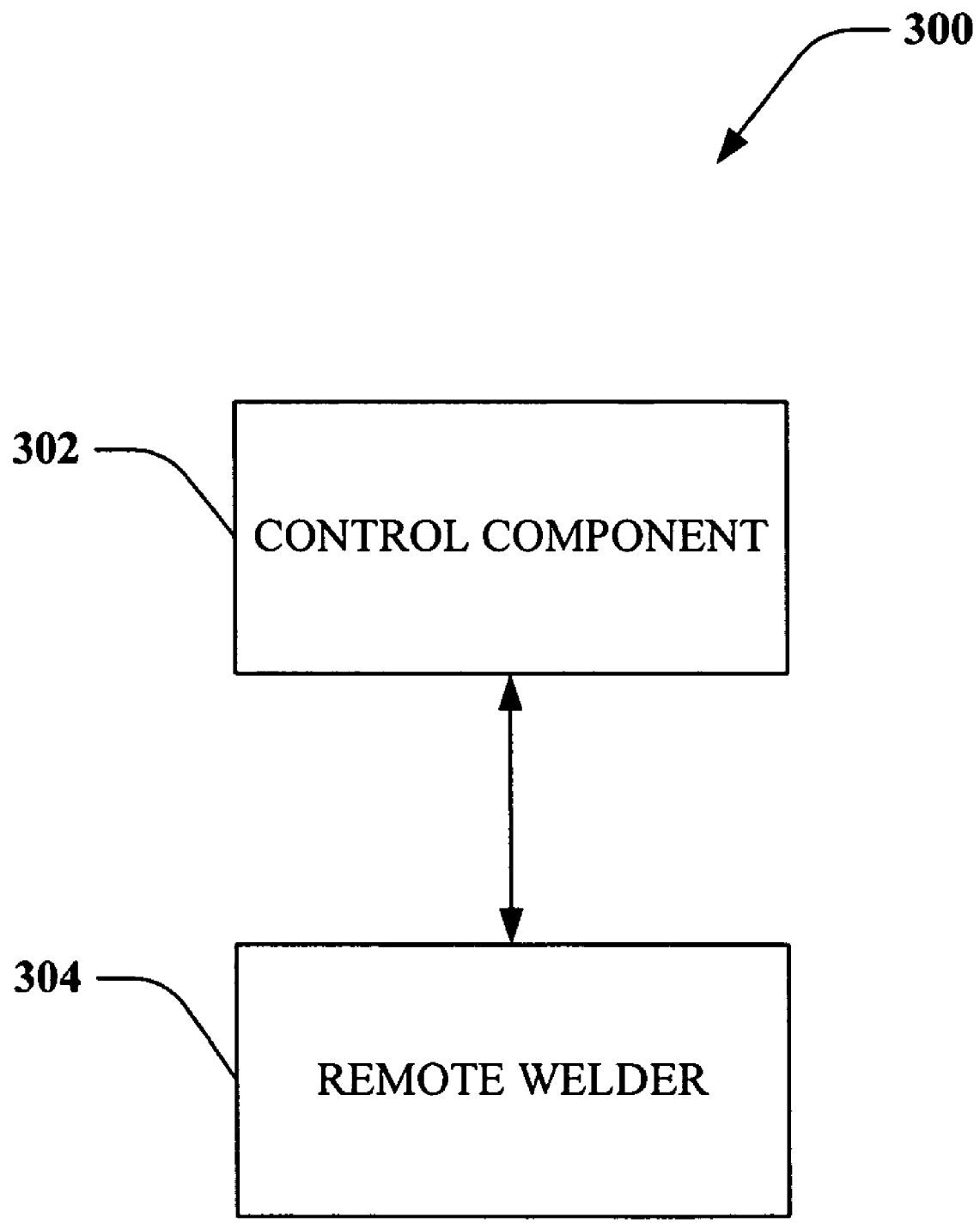
FIG. 3 illustrates a welder control system 300 that facilitates event-triggered control of remotely located workstations, such as remote welding units in a manufacturing environment, in accordance with an aspect of the subject invention.

FIG. 3 illustrates a welder control system 300 that facilitates event-triggered control of remotely located workstations, such as remote welding units in a manufacturing environment, in accordance with an aspect of the subject invention. The system 300 comprises a control component 302 that is operatively coupled to one or more remotely located welders 304. For instance, as described above, each remote welder 304 can be fitted with its own power source, thereby eliminating any need for cumbersome power cables, which can exceed hundreds of feet in length at a fabrication site. Additionally, each welder can be fitted with an internal clock such that triggering events can be defined and, upon their occurrence, the control component 302 can trigger an action in the welder. The control component 302 can be integral to the welder, or, if desired, can be external there to and can receive information related to welder operation from the welder 304.

For example, a timing event can trigger a response from the control component 302 to ensure that a remote welder 304 is operating correctly, is not operating, etc. According to one example, a trigger can be preset for a specific time of day (e.g., 21:00), such that the when the specific time of day occurs, the control component 302 can cause the remote welder to generate shift report data (e.g., depletion of consumables such as gas, tip wear, and the like, duty cycle, operation time, . . . ), to enter a sleep mode, to power down to a standby mode, to purge gas lines feeding the welder 304, etc. In this manner, the system 300 can ensure that a remote welder 304 is not operational during a non-work period on a job site. For instance, a welder operator can inadvertently fail to properly shut down a remote welder 304, due to an emergency, forgetfulness, etc. By providing a temporal trigger to ensure welder shutdown, the system 300 facilitates reducing costs associated with welder operation (e.g., power consumption, . . . ), etc.

Figure 4:
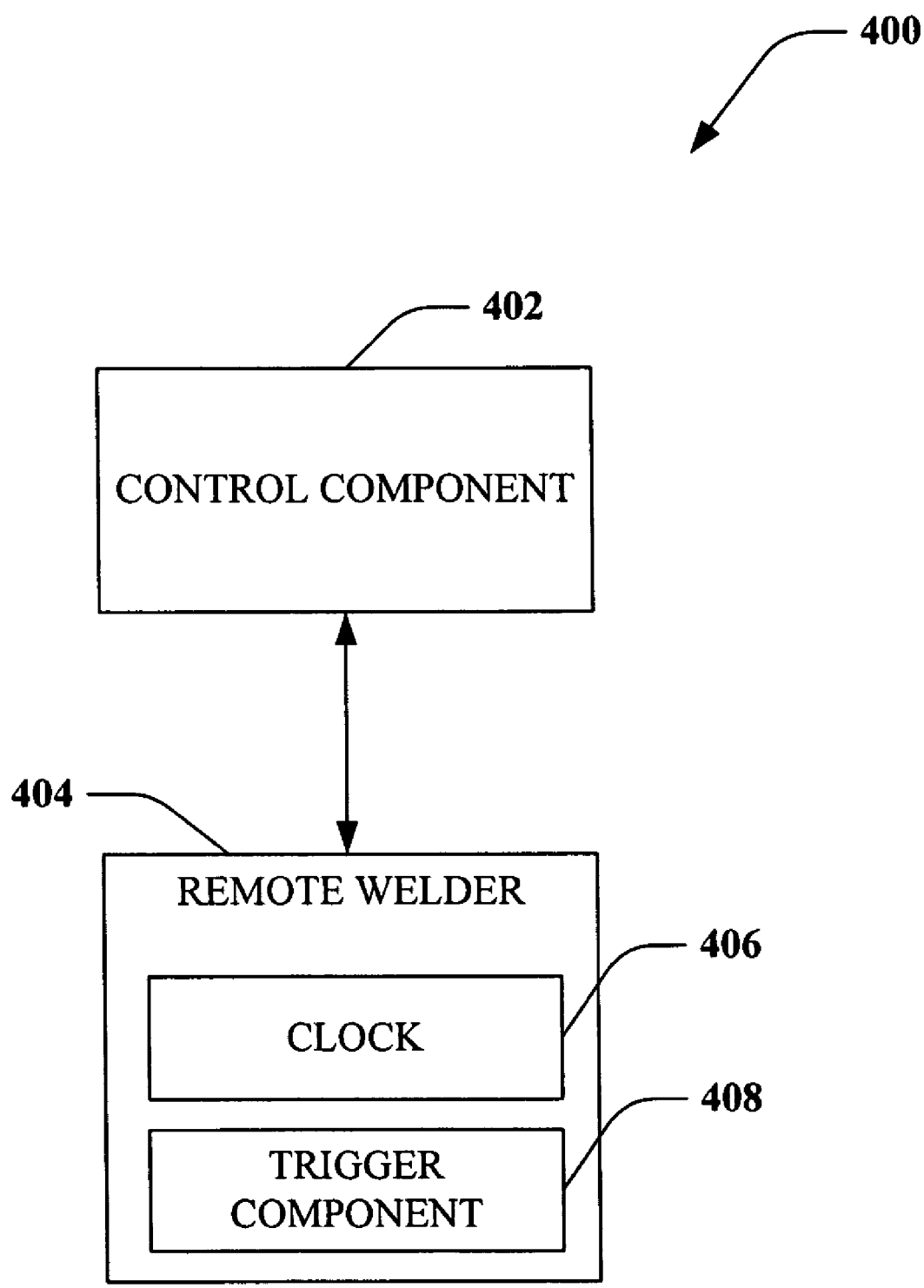
FIG. 4 illustrates a system 400 that facilitates providing trigger-based control of one or more remote devices in accordance with an aspect of the subject invention.

FIG. 4 illustrates a system 400 that facilitates providing trigger-based control of one or more remote devices in accordance with an aspect of the subject invention. A control component 402 is provided that can receive information related to the occurrence of a trigger event and initiate an action to cause a change in an operating state of an associated welder 404 in a manufacturing environment. The welder 404 can comprise a clock 406 that facilitates trigger event creation and/or recognition by a trigger component 408. For instance, a trigger event can be a specific temporal period or point, such that the triggering component 408 can receive an indication of a temporal trigger from the clock 406 and can initiate an action. Additionally, the trigger component 408 can comprise a data store that retains predefined trigger event information, such that when a trigger event such as a pre-specified time is registered by the clock 406, the trigger component 408 recognizes the event and can signal the control component 402 to trigger an action by the welder 404. For example, the action can be generation of a shift report comprising information related to welder usage (e.g., operation time, gas consumption, wire usage, tip wear, . . . ) during a shift, generation of an email comprising the shift report, a power-down command, etc.

According to another aspect of the invention, the trigger component 408 can provide time-stamp capability to the system 400, such that trigger events and or actions taken in response thereto can be time stamped in order to facilitate generating historical data related to the remote welder(s) 404. According to a related example, the trigger component 408 can time stamp any action taken by or on the remote welder(s) 404 to generate such historical data and to facilitate retroactive analysis of welder health, operation, shift report data, etc.

Figure 5:
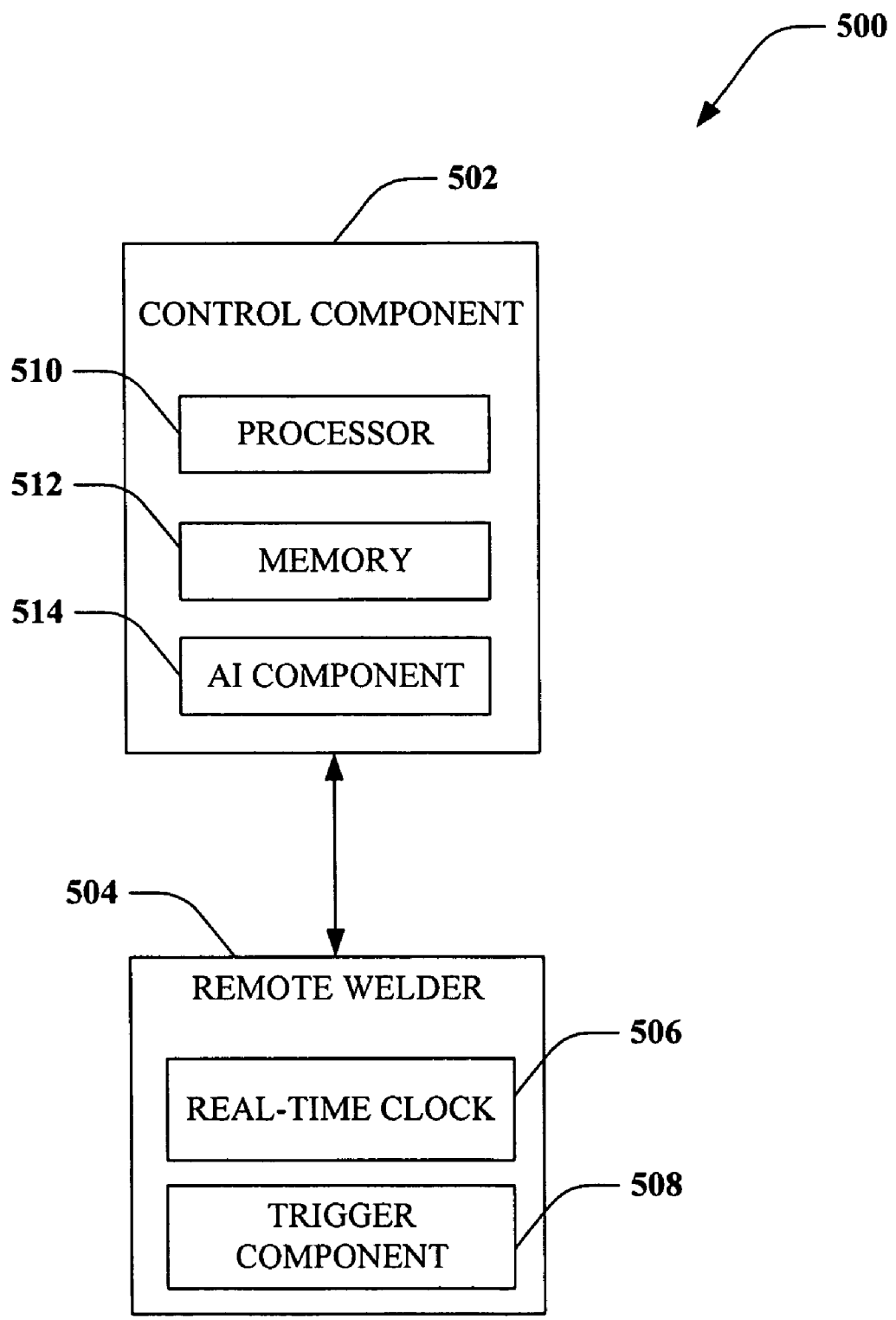
FIG. 5 is an illustration of a system 500 that facilitates generating and/or responding to event triggers in a manufacturing environment in accordance with an aspect of the subject invention.

FIG. 5 is an illustration of a system 500 that facilitates generating and/or responding to event triggers in a manufacturing environment in accordance with an aspect of the subject invention. The system 500 comprises a control component 502 coupled to a welder 504, each of which can comprise a clock 506 and a trigger component 508, as discussed supra. Additionally and/or alternatively, the clock 506 and/or the trigger component 508 can be operatively associated with the control component 502.

The control component 502 comprises a processor 510 that facilitates analyzing information related to trigger events. It is to be understood that a that the processor 510 can be a processor dedicated to facilitating trigger event analysis and/or response thereto, a processor used to control one or more of the components of the system 500, or, alternatively, a processor that is both used to facilitate trigger event analysis and/or response thereto and to control one or more of the components of the system 500.

The control component 502 further comprises a memory 512 that can retain information associated with, for example, trigger events, responsive actions, welder status, etc. Furthermore, the memory 512 can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 512 of the present systems and methods is intended to comprise, without being limited to, these and any other suitable types of memory.

The system 500 further comprises an artificial intelligence (AI) component 514 that can make inferences regarding an appropriate course of action in response to a trigger event. The system 500 can thus employ various inference schemes and/or techniques in connection with determining an appropriate time for memory refresh in order to mitigate data loss. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

For example, the AI component 514 can receive information related to a trigger event from the trigger component 508, the processor 510, etc., and can infer an appropriate course of action with regard to a welder 504. To further this example, a triggering event can be an expiration of a period of welder dormancy, such that an assumption can be made that the welder is need not be maintained at a high power state. For instance, a triggering event can be "30 minutes after last action," and a responsive action can be assigned to the triggering event, such as an "enter low-power mode" command. According to this scenario, when the control component 502 receives an indication from the triggering component 508 that not activity has occurred at the welder 504 for more than half an hour, then the control component 502 can cause the welder 504 to power down in order to reduce power consumption, extend operating life of the welder, etc. However, the AI component 514 can determine that the welder should not be powered down despite the occurrence of the triggering event. For instance, the welder can be dormant for a 30-minute period that occurs between 12:00 and 12:30. The AI component 514 can infer that the period of dormancy occurred during the middle of a shift (e.g., a lunch break, . . . ), and as such is inconsistent with normal periods of operation of the welder 504. According to this scenario, the AI component 514 can infer that the triggering event should be ignored and/or the reaction thereto should be suspended for all or part of another 30-minute period to maintain the welder 504 in a ready-to-operate condition in the event that an operator returns to the welder 504 during the shift.

According to yet another example, the AI component 514 can infer that a welder malfunction is imminent based on, for example, information contained in a shift report, etc., and can make inferences regarding shutting the welder 504 down, scheduling maintenance for the welder 504, purging gas lines, etc. This aspect of the invention provides for reduced operating costs and potentially prolonged operating life.

Figure 6:
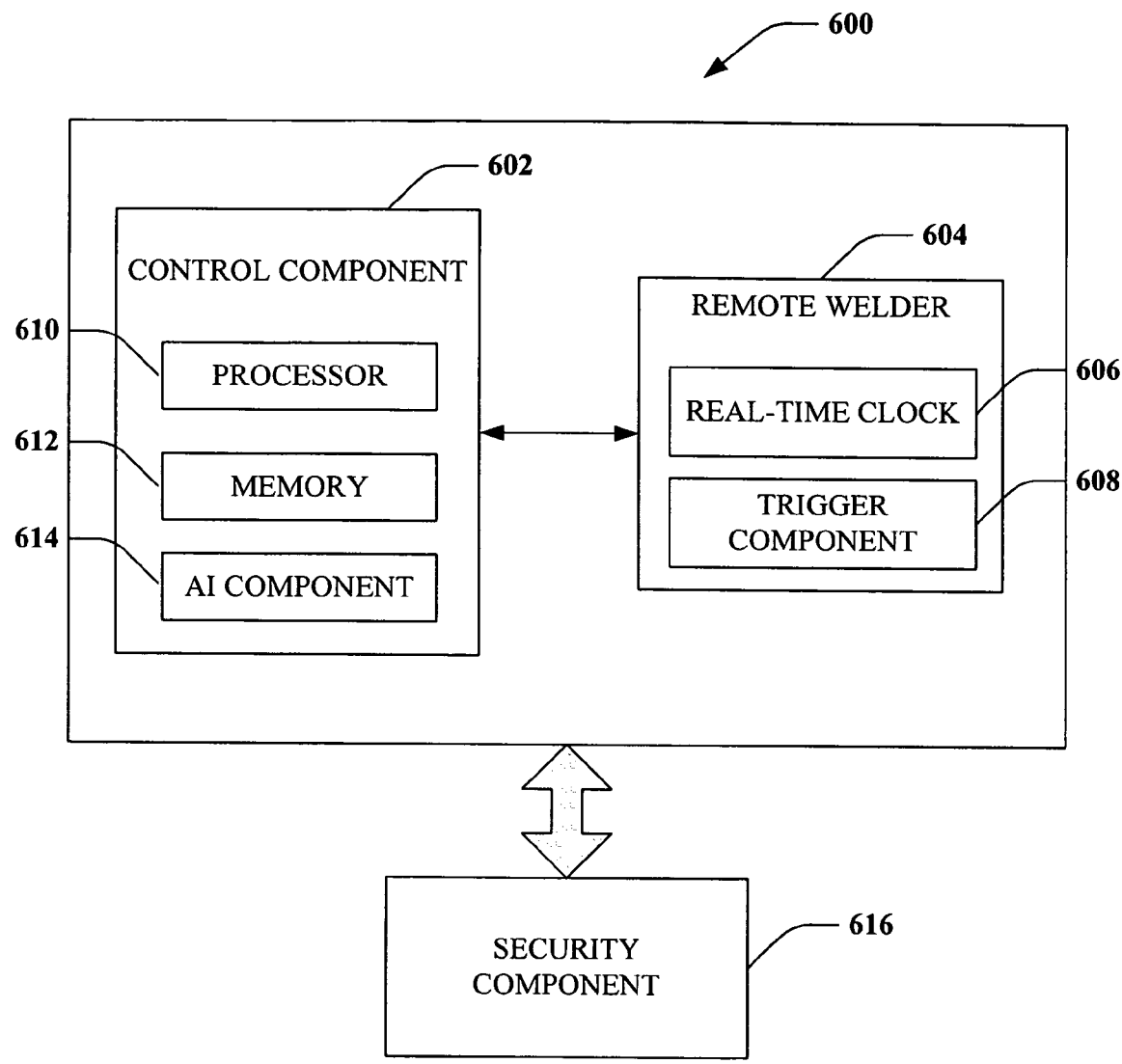
FIG. 6 illustrates a system 600 that facilitates control of a manufacturing tool based at least in part on trigger event information, in accordance with an aspect of the invention.

FIG. 6 illustrates a system 600 that facilitates control of a manufacturing tool based at least in part on trigger event information, in accordance with an aspect of the invention. The system 600 comprises a control component 602 that is operatively coupled to a welder 604. The welder 604 can comprise a real-time clock 606 and a trigger component 608 that can compare predefined trigger events to temporal information provided by the clock 606 in order to determine whether a trigger event has occurred. The control component 602 can further comprise a processor 610, a memory 612, and an AI component 614, as set forth supra with respect to FIG. 5.

The system 600 further comprises a security component 616 that can facilitate verifying that a user has authority to access the system 600, either via a centralized control site or at the welder 604. For example, the security component 616 can employ suitable identity verification means (e.g., ID number; personal ID information such as name, date of birth, etc.; finger print ID; retinal scan; voice recognition; . . . ). The security component 616 can increase system security be ensuring that unauthorized access to the system 600 is not permitted. Thus, system settings such as defined triggering events and the like cannot be tampered with when the system 600 is unsupervised.

Additionally, the security component 616 can be employed in conjunction with the control component 602 to permit remote login to the system 600. For example, it may be determined that a welder 604 has been inadvertently left in a powered state when it is desired that the welder 604 be powered down for safety reasons, cost reasons, an unexpected factory shut-down, etc. A user with proper authority can remotely access the system 600 via, for example, a remotely connected laptop, a cell phone, a PDA, etc., and can thereby enter identification information to access the system. Such connection can be wired or wireless, depending on a user's specific needs and/or desires. If it is determined that the user has authority to change system parameters, operating conditions, etc., then the user can shut down, power up, etc., the remote welder 606 without requiring physical presence at the welder 604, or even in the factory/site at which the welder is located. Various levels of authentication can be employed by the system 600 depending on a user's desires, and remote access can be temporally restricted if so desired. Moreover, an authorized user with proper identification can access the system to override operation parameters that are subject to event triggers. For instance, the clock 606 might register 17:00, which event can be assigned to trigger the control component 602 to power down the welder 604 or to ensure that the welder 604 is already powered down. However, a user desiring to continue construction, fabrication, etc., around the clock can override the automated shut down in order to permit the welder 604 to be run after 17:00. According to a related example, proper identification can be required in order to access the system 600 to define and/or redefine trigger events.

Figure 7:
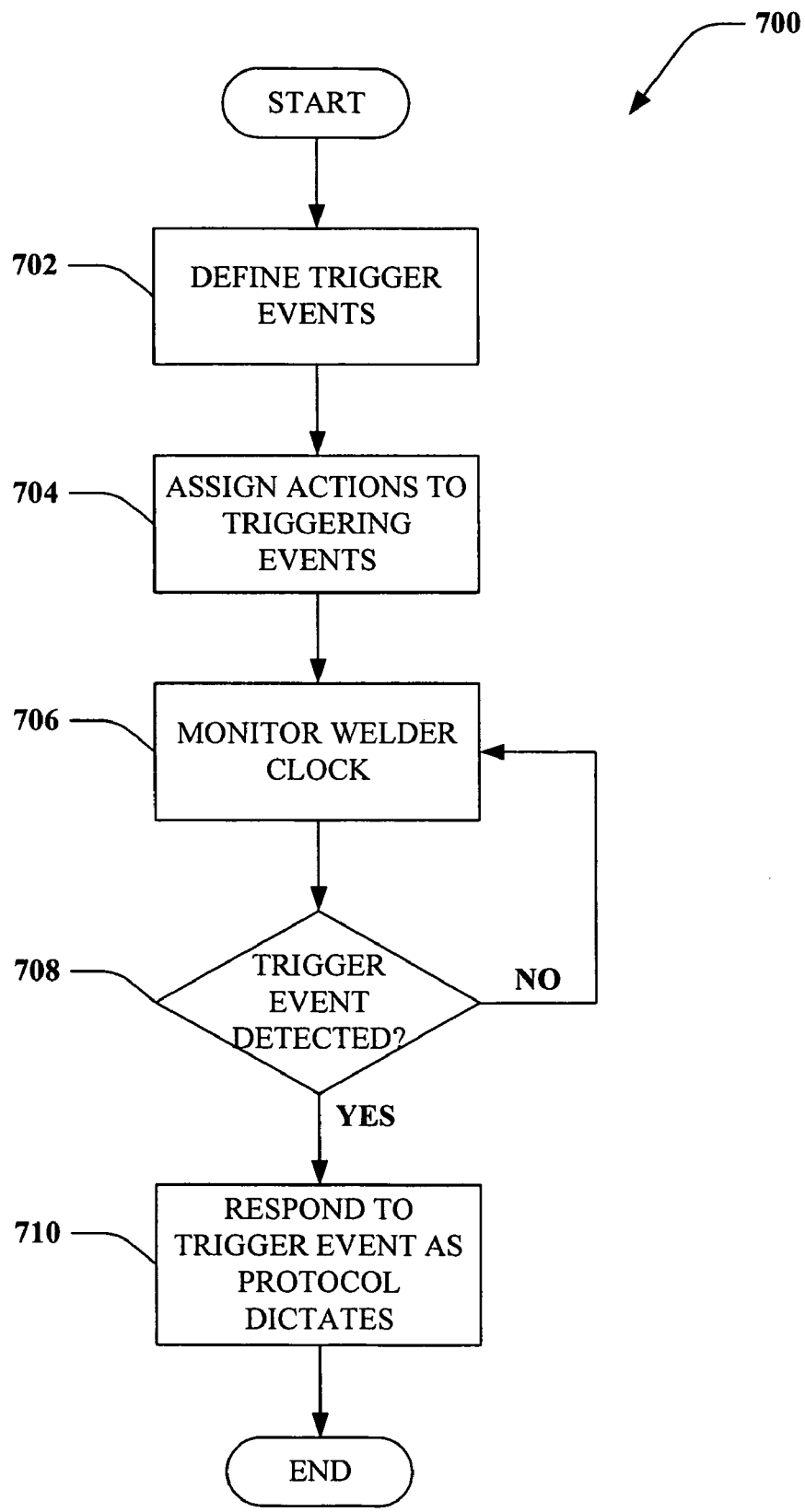
FIG. 7 illustrates a methodology 700 for setting, identifying, and/or responding to trigger events associated with a welding system in accordance with an aspect of the subject invention.
Figure 8:
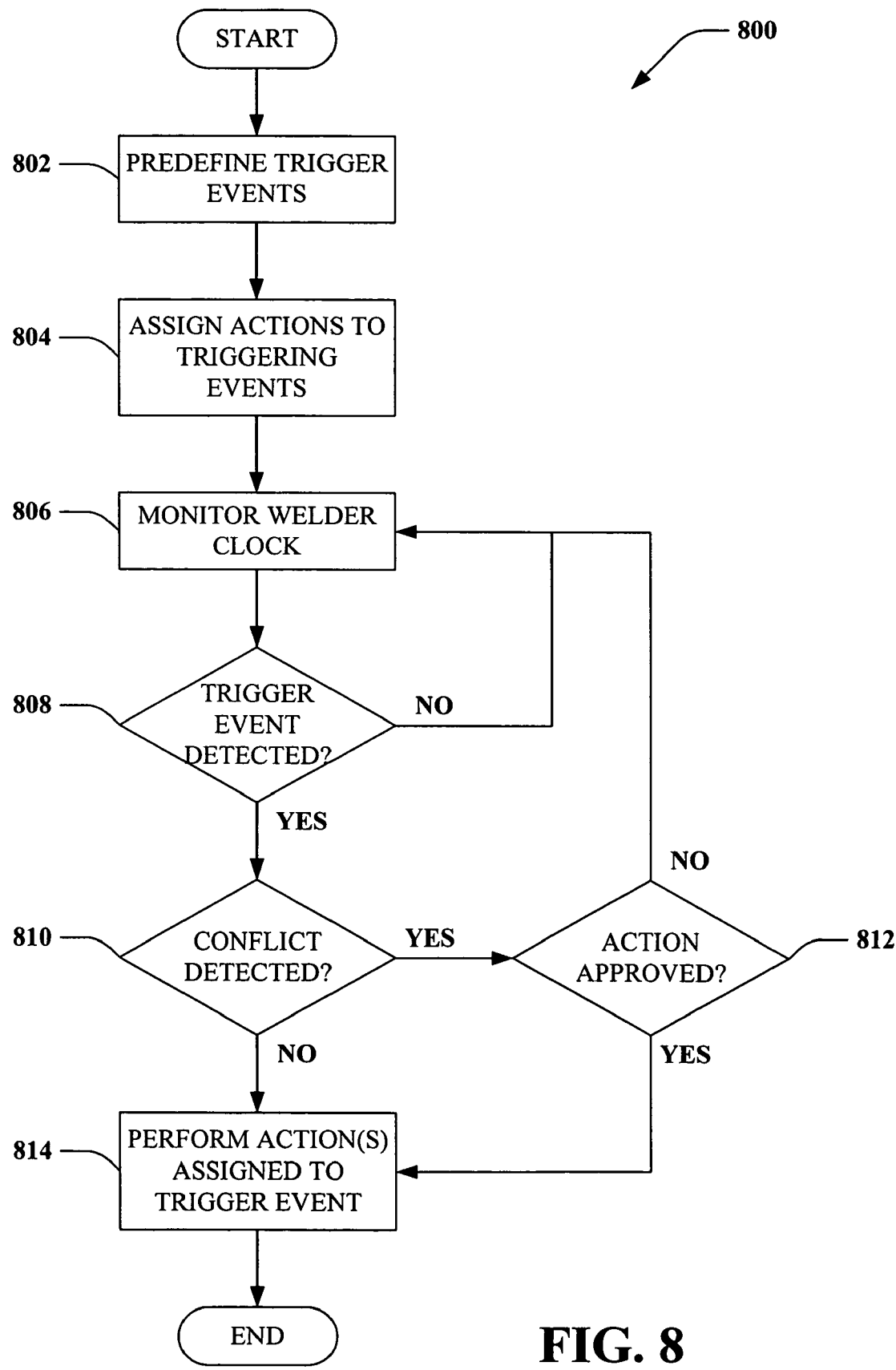
FIG. 8 is an illustration of a methodology 800 for employing triggering events to control one or more welders in accordance with an aspect of the subject invention.

Referring to FIGS. 7 and 8, various methodologies in accordance with various aspects of the subject invention are illustrated. While, for purposes of simplicity of explanation, the methodologies are shown and described as a series of acts, it is to be understood and appreciated that the subject invention is not limited by the order of acts, as some acts can, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 7 illustrates a methodology 700 for setting, identifying, and/or responding to trigger events associated with a welding system in accordance with an aspect of the subject invention. At 702 a trigger event list can be defined. For example, trigger events can be temporal points, such as a specific time of day, day of week, etc. A trigger event can be preset to define an occurrence upon which an assigned action will be performed on or by a welder. Moreover, a trigger event can be defined as a point at which a time period has expired, such as, for instance, "one hour after last welder action," "fifteen minutes before end-of-shift," etc. Then at 704, an action can be associated with each triggering event. For example, when one hour has expired since a last welder action, an action can be triggered to power-down the welder to reduce operating costs and increase welder operating life. According to another example, a triggering event can be a fifteen-minutes-before-shift-change, and an action can be associated therewith, such as a command to enter a self-diagnostic mode to ensure that the welder is in optimal operating condition for another shift. According to yet another example a triggering event such as 20:00 (e.g., 8 pm) can be predefined and associated with an action to power down the welder to ensure that the welder is not operational at the end of a work period. It is to be appreciated that the preceding examples of triggering events and actions associated therewith are not to be construed in a limiting sense, but rather triggering events can comprise any suitable temporal point, time range, etc., that can be registered by a clock associated with a welder, and can be associated with any suitable action that can be triggered in the welder and/or performed upon the welder.

At 706, a clock or timer associated with the welder can be monitored to assess a status thereof (e.g., time . . . ). At 708 a determination can be made regarding whether a triggering event has occurred. For example, if a triggering event defined as 06:00 at 702, then the occurrence of 06:00 can be determined at 708. If the determination at 708 indicates that 06:00 has not occurred, then the method can revert to 704 for continued monitoring of the welder clock in order to provide a feedback loop to continuously monitor the clock. If the determination at 708 indicates that 06:00 has occurred (e.g., that a triggering event has occurred), then at 710, an action responsive to the triggering event can be initiated. For example, if the triggering event is 06:00, as described above, then an associated action assigned at 704 can be a power-up of the welder to prepare the welder for operation at a beginning of a work period. Such action can then be initiated at 710 in response to the detection at 708 of the occurrence of the triggering event.

FIG. 8 is an illustration of a methodology 800 for employing triggering events to control one or more welders in accordance with an aspect of the subject invention. At 802, triggering events can be defined and stored in a database (e.g., centrally located and/or located at each welder). Triggering events can comprise, without being limited to, predetermined times and/or ranges thereof (e.g., 5 am, 4 pm, 2-3 pm . . . ), holidays (e.g., a clock can register a known holiday date or dates that can be employed to trigger an automated shut down of remote welders to prevent unauthorized use thereof by trespassers and the like . . . ), and/or any suitable event that can be employed to trigger an automated action by a control component on or within a welder.

At 804, actions can be assigned to and/or associated with specific triggering events, such that the occurrence of a triggering event will cause the associated action to be initiated. A clock associated with the welder can be monitored at 806. The clock can be local to the welder and/or can be synchronized periodically to a master real-time clock that can govern a plurality of disparately located welder clocks in, for instance, a manufacturing facility. A determination can be made at 808 regarding whether one or more of the triggering events defined at 802 has occurred. If a triggering event is not detected at 808, then the method can revert to 806 for continued assessment of the status of the clock associated with the welder. If the determination at 808 indicates that a triggering event has occurred, then a second determination can be made at 810 regarding whether the action associated with the detected triggering event conflicts with an extant operating condition, user desire, etc. If no conflict is detected, then the method can proceed to 814, where the action assigned to the triggering event at 804 can be initiated.

If the determination at 810 indicates that the assigned action conflicts with an existing or desired condition at the welder, then the method can require human approval of the triggered action. For example, a triggering event can be 19:00, the occurrence of which can trigger an automated shut-down action to ensure that the welder is not operational after business hours (e.g., to prevent unnecessary power consumption, unauthorized tampering with the welder, . . . ). However, a particular manufacturing job can require that a factory extend its operational hours to fill a contract by a deadline, and extended business hours can become necessary with little notice. In such a case, a welder can be in use when the 19:00 triggering event is detected, such that an automated power-down of the welder can be deemed inconsistent with the present operating condition of the welder. In such a case, human approval of the power-down action triggered by the occurrence of 19:00 can be required at 812. In the absence of such approval, the method can revert to 806 for continued monitoring of the welder clock to provide a loop via which triggering event detection can resume. If human approval of the triggered action is provided at 812, then the method can proceed to 814 where the triggered action can be initiated and/or performed.

According to a related aspect, a user can tag specific actions assigned to various triggering events at 804 for human approval, such that tagged actions will not be performed without such approval regardless of the operating status of the welder. For example, an automated shutdown of the welder at a specific time after end-of-business can be tagged to require human approval in, for instance, a manufacturing environment that frequently operates beyond normal business hours.

Figure 9:
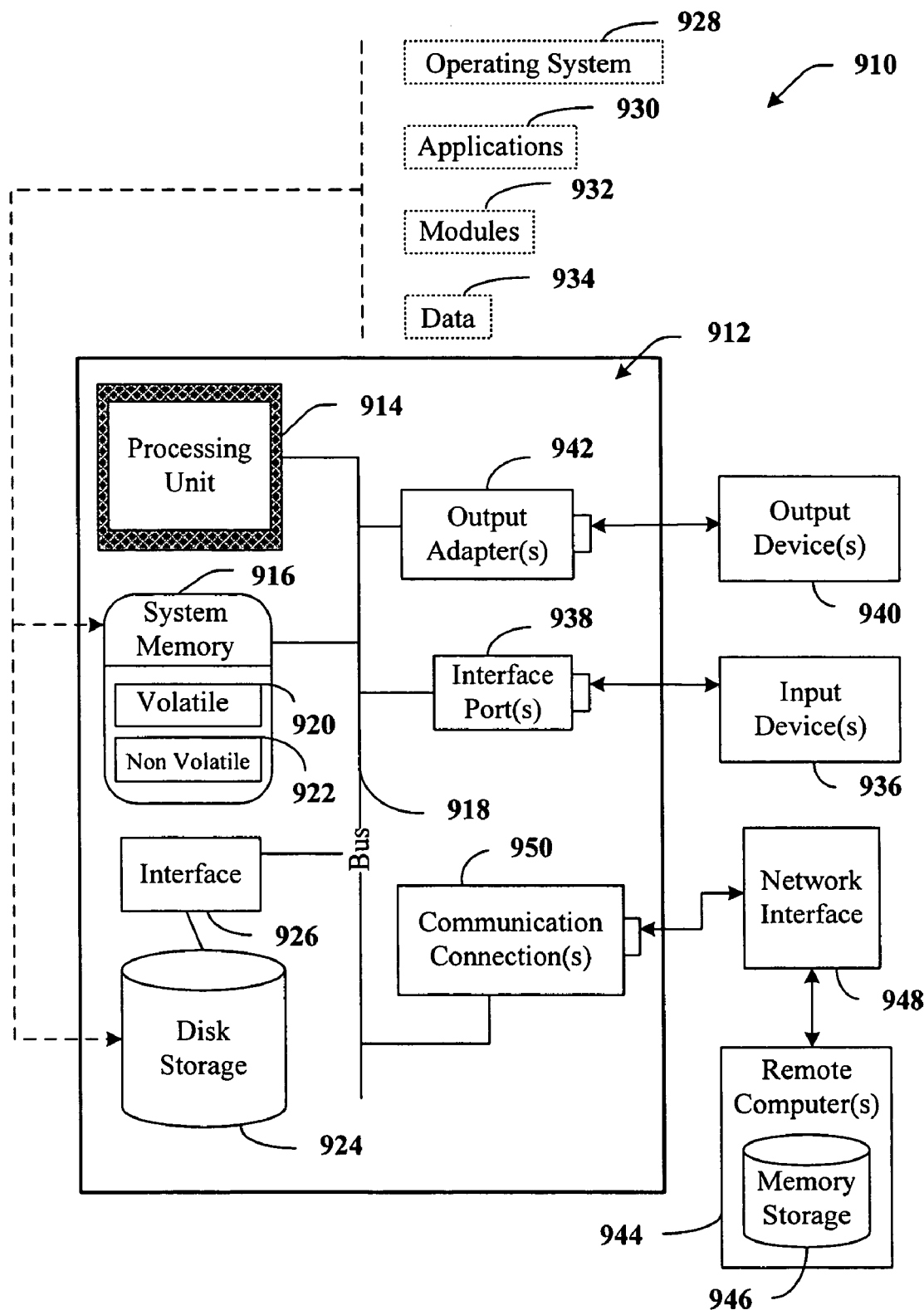
FIG. 9 is an exemplary operating environment 900 that can be employed in connection with the subject invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
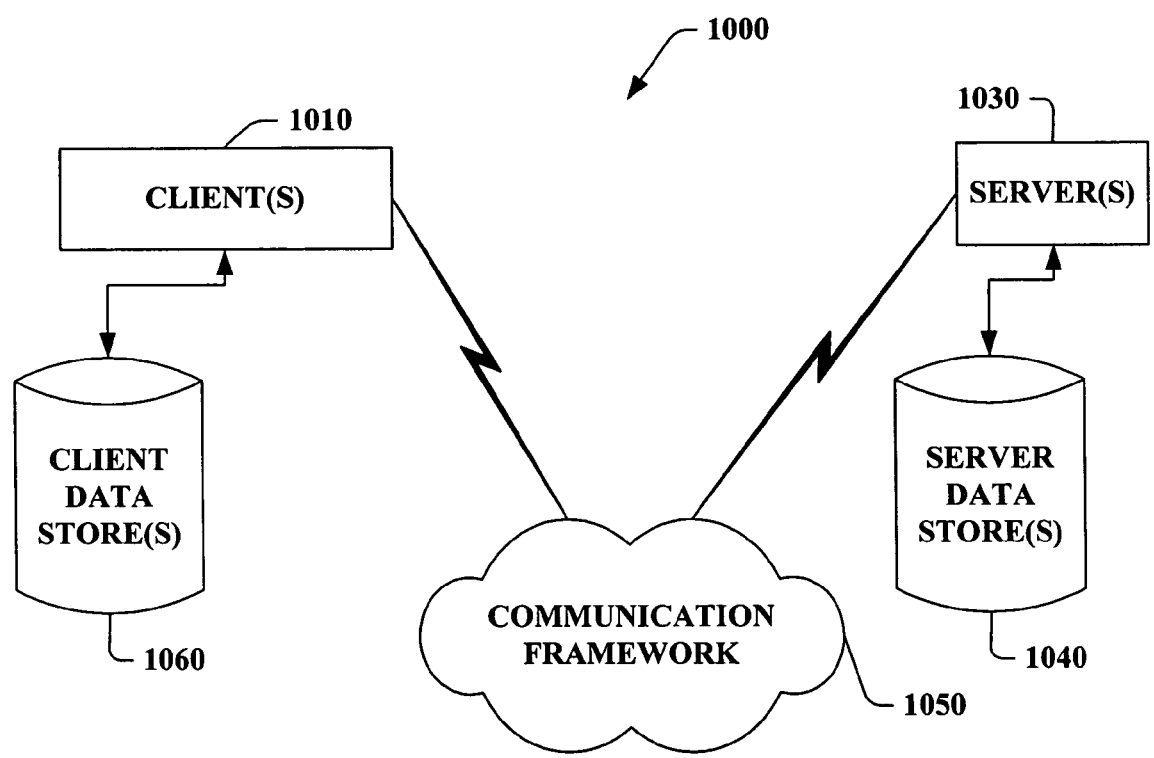
FIG. 10 is a schematic block diagram of a sample-computing environment 1000 with which the subject invention can interact.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates controlling a welding device based on triggering events, comprising:
   a real-time clock, internal to a welding device, that provides temporal information that is utilized to define triggering events;
   a trigger component that stores a plurality of triggering event definitions, verifies that a triggering event has occurred based at least in part on comparing the temporal information received from the clock to the triggering event definitions and produces a signal indicating that the triggering event has occurred; and
   a control component that initiates a responsive action in the welding device in response to the signal and assesses whether the responsive action causes a conflict with an existing condition of the welding device.

2. The system of claim 1, the triggering event is a specific time point.

3. The system of claim 1, the responsive action comprises placing the at least one welding device in a low-power mode.

4. The system of claim 1, the responsive action comprises at least one of powering on or powering off the at least one welding device.

5. The system of claim 1, the responsive action comprises generating a shift report and an associated email notification for transmission to a central control location.

6. The system of claim 5, the shift report comprises information associated with at least one of an operating time for the at least one welding device or resource consumption for the at least one welding device.

7. The system of claim 1, the triggering event is an expiration of a time period after a last action performed by the at least one welding device.

8. The system of claim 7, the responsive action comprises causing the at least one welding device to enter a low-power mode.

9. The system of claim 1, further comprising a security component that permits authorized personnel to alter at least one of the plurality of trigger event definitions upon authentication of personnel identification information.

10. The system of claim 1, the control component requests approval to perform the action in the presence of a conflict.

11. A method for controlling a welder based on triggering event information, comprising:
    defining a list of triggering events, wherein each triggering event corresponds to a temporal range or a time range registered by a clock associated with a welder;
    assigning at least one action to be performed upon the welder in response to each triggering event;
    continuously monitoring the clock to determine whether at least one of the triggering events has occurred;
    detecting at least one of the triggering events;
    assessing whether the at least one action associated with the at least one of the triggering events causes a conflict with one of an existing condition or a desired condition; and
    performing the assigned action in response to the detected triggering event.

12. The method of claim 11, the triggering event is an occurrence of a specific, predefined time.

13. The method of claim 11, the action comprises generating a shift report and transmitting the shift report via an email.

14. The method of claim 11, the action comprises at least one of powering up the welder and powering down the welder.

15. The method of claim 11, the triggering event comprises an expiration of a predefined time period after a last welder action.

16. The method of claim 15, the action comprises triggering the welder to enter a low-power standby mode.

17. The method of claim 11, further comprising requesting approval to perform the action in the presence of a conflict.

18. A system that facilitates controlling disparately located welders distributed throughout a manufacturing environment, comprising:
    means for defining one or more triggering events;
    means for storing the defined triggering events and recognizing an occurrence of at least one of the defined triggering events, wherein the defined triggering events are associated with one or more actions; and
    means for initiating an action associated with the recognized triggering event and requiring approval to perform the action associated with the recognized triggering event in the presence of a conflict with a present operating condition.

19. The system of claim 18, the triggering event is a specific time-of-day and the associated action is at least one of powering on at least one welder, powering off at least one welder, causing at least one welder to enter a low-power mode, generating a shift report, or transmitting an email comprising shift report data.

20. The system of claim 18, the means for defining the one or more triggering events is a clock internal to a welder.

* * * * *